United States Patent
Kim et al.

(10) Patent No.: US 7,796,577 B2
(45) Date of Patent: Sep. 14, 2010

(54) METHOD FOR DESIGNING OPERATION SCHEDULES OF FFT AND MIMO-OFDM MODEM THEREOF

(75) Inventors: Jun-Woo Kim, Daejeon (KR); Jae-Gun Jung, Daejeon (KR); Youn-Ok Park, Daejeon (KR)

(73) Assignees: Electronics and Telecommunications Research Institute, Daejeon (KR); Samsung Electronics Co., Ltd., Suwon-si (KR); KT Corporation, Seongnam (KR); SK Telecom Co., Ltd, Seoul (KR); KTFreetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 700 days.

(21) Appl. No.: 11/721,421

(22) PCT Filed: Nov. 22, 2005

(86) PCT No.: PCT/KR2005/003940

§ 371 (c)(1),
(2), (4) Date: Jun. 11, 2007

(87) PCT Pub. No.: WO2006/065026

PCT Pub. Date: Jun. 22, 2006

(65) Prior Publication Data

US 2009/0231992 A1 Sep. 17, 2009

(51) Int. Cl.
*H04J 1/00* (2006.01)
*H04J 11/00* (2006.01)
*H04W 4/00* (2009.01)
*H04B 1/40* (2006.01)
*H04B 1/034* (2006.01)
*H03D 7/16* (2006.01)

(52) U.S. Cl. .................. 370/343; 370/210; 370/328; 370/338; 370/430; 455/84; 455/95; 455/131

(58) Field of Classification Search ......... 370/208–211, 370/329, 339, 344; 455/84, 557
See application file for complete search history.

(56) References Cited

U.S. PATENT DOCUMENTS

| 6,401,162 | B1* | 6/2002 | Nasserbakht | 711/5 |
| 2001/0053143 | A1* | 12/2001 | Li et al. | 370/344 |
| 2002/0111142 | A1* | 8/2002 | Klimovitch | 455/63 |
| 2004/0047285 | A1* | 3/2004 | Foerster et al. | 370/210 |
| 2004/0071079 | A1* | 4/2004 | Han | 370/210 |

FOREIGN PATENT DOCUMENTS

WO  WO 03058871 A1  7/2003
WO  WO 2005-112323 A2  11/2005

OTHER PUBLICATIONS

Defeng Huang, et al. "A reduced complexity coded OFDM system with MIMO antennas for broadband wireless communications", pp. 661-665, 2002.

* cited by examiner

*Primary Examiner*—John Pezzlo
*Assistant Examiner*—Jeremy Costin
(74) *Attorney, Agent, or Firm*—Jefferson IP Law, LLP

(57) ABSTRACT

The present invention provides a method for designing operation schedules of a fast Fourier transform (FFT) and a multiple input multiple output orthogonal frequency division multiplexing modem (MIMO-OFDM modem) thereof. According to the present invention, an operation speed of an FFT operator is set up, a receiving symbol is arranged in an OFDM symbol duration in an FFT after receiving the symbol, a transmitting symbol is arranged in an OFDM symbol duration in the FFT schedule before transmitting the symbol, a transmitting/receiving symbol which has the same timing is inserted into an idle symbol duration of the FFT schedule, an FFT schedule which is good to be deleted is deleted, and symbols of the deleted FFT schedule are re-arranged in order to not have an error occur in transmitting/receiving timing.

11 Claims, 11 Drawing Sheets

[Fig. 5]
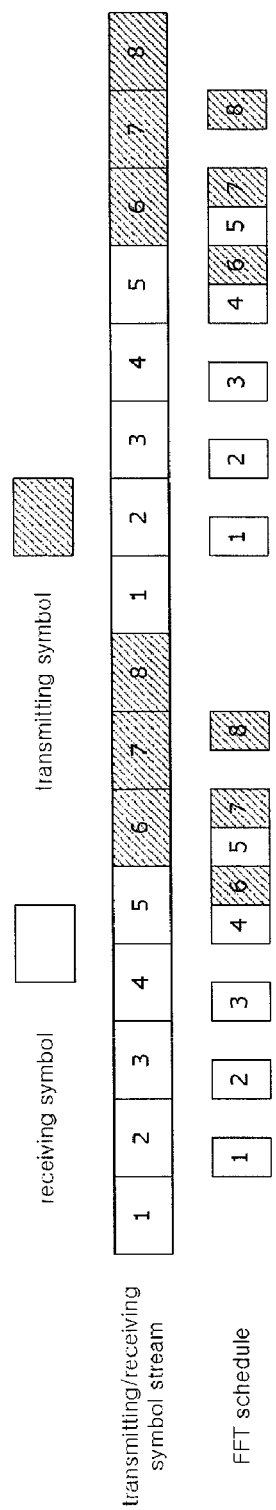

[Fig. 6]
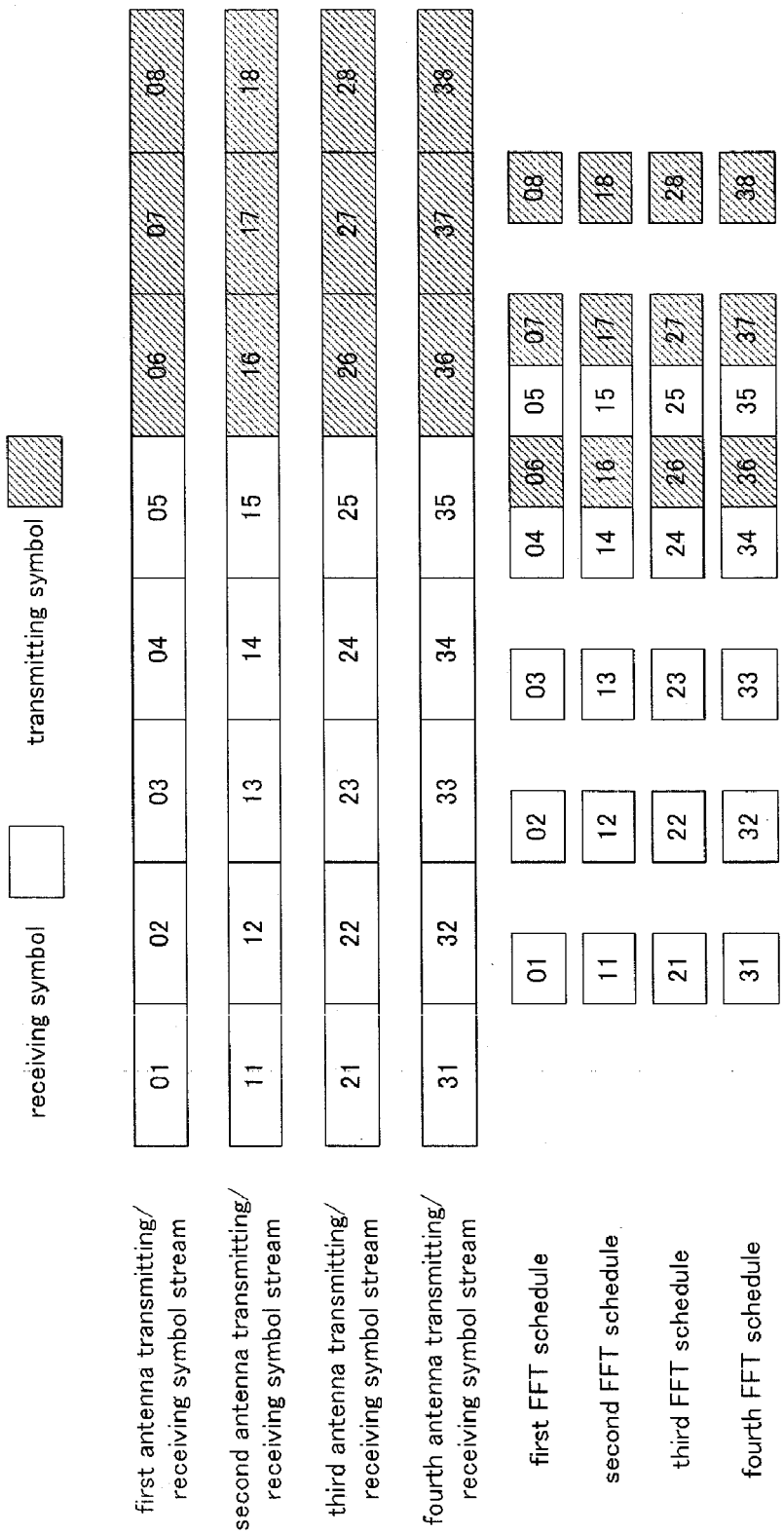

[Fig. 7]
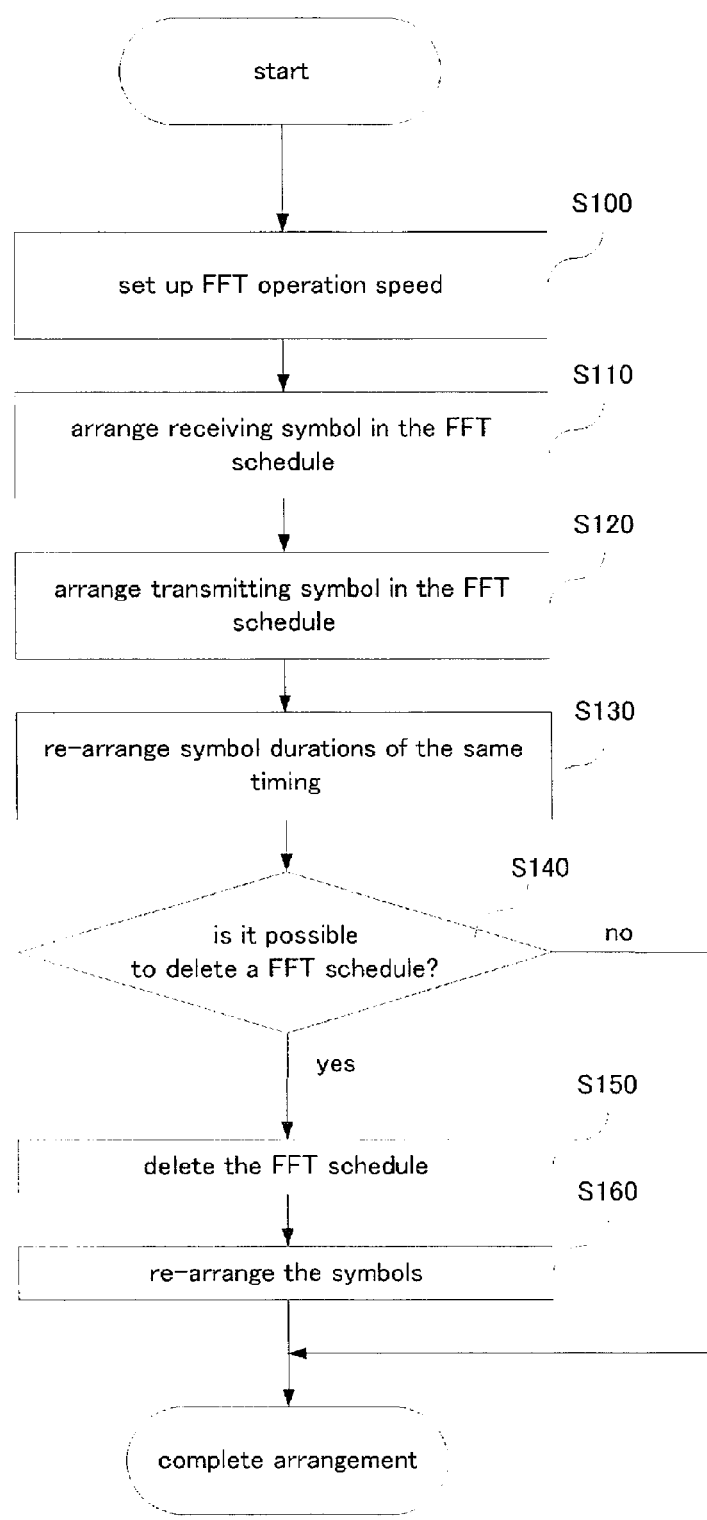

[Fig. 8]
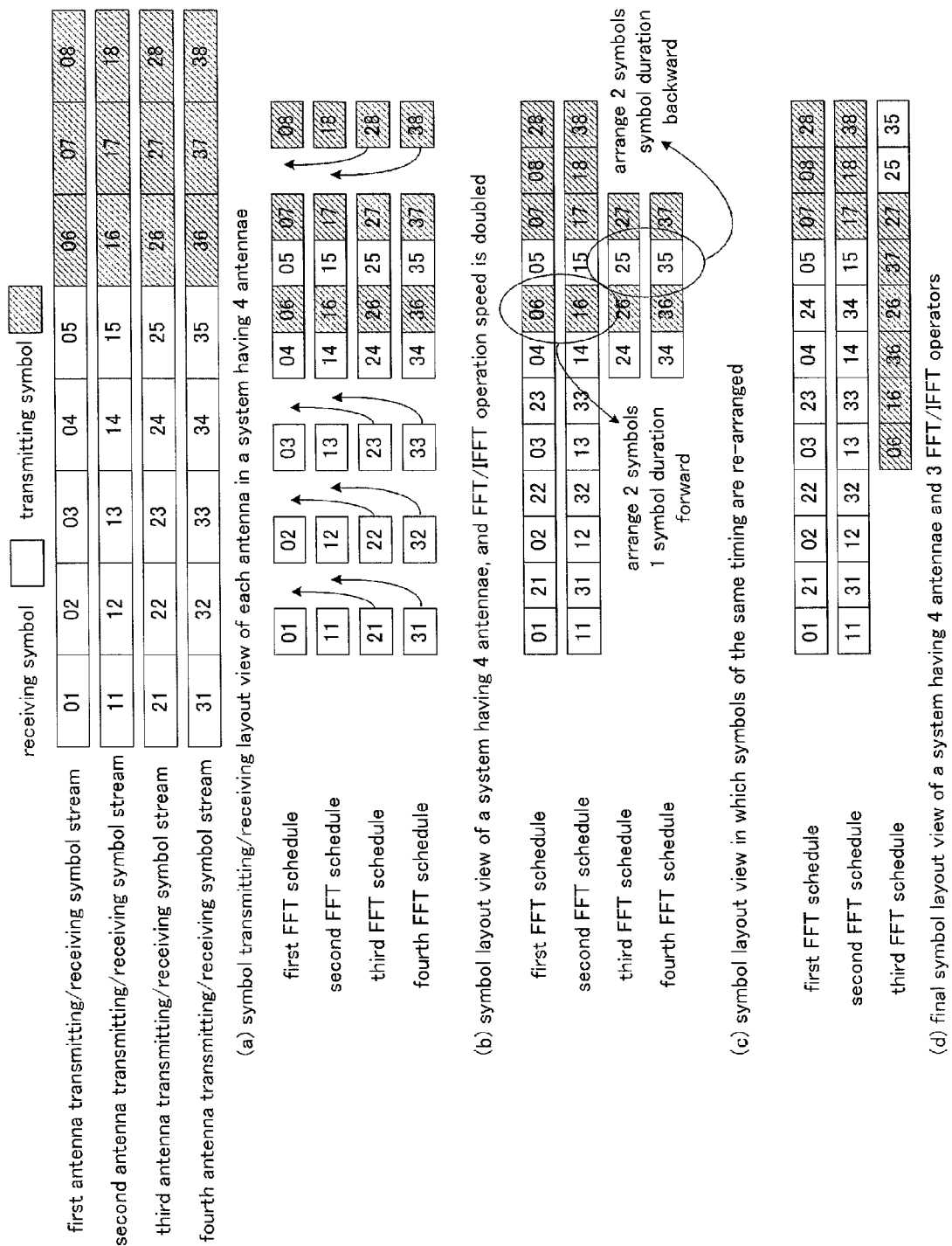

[Fig. 11]
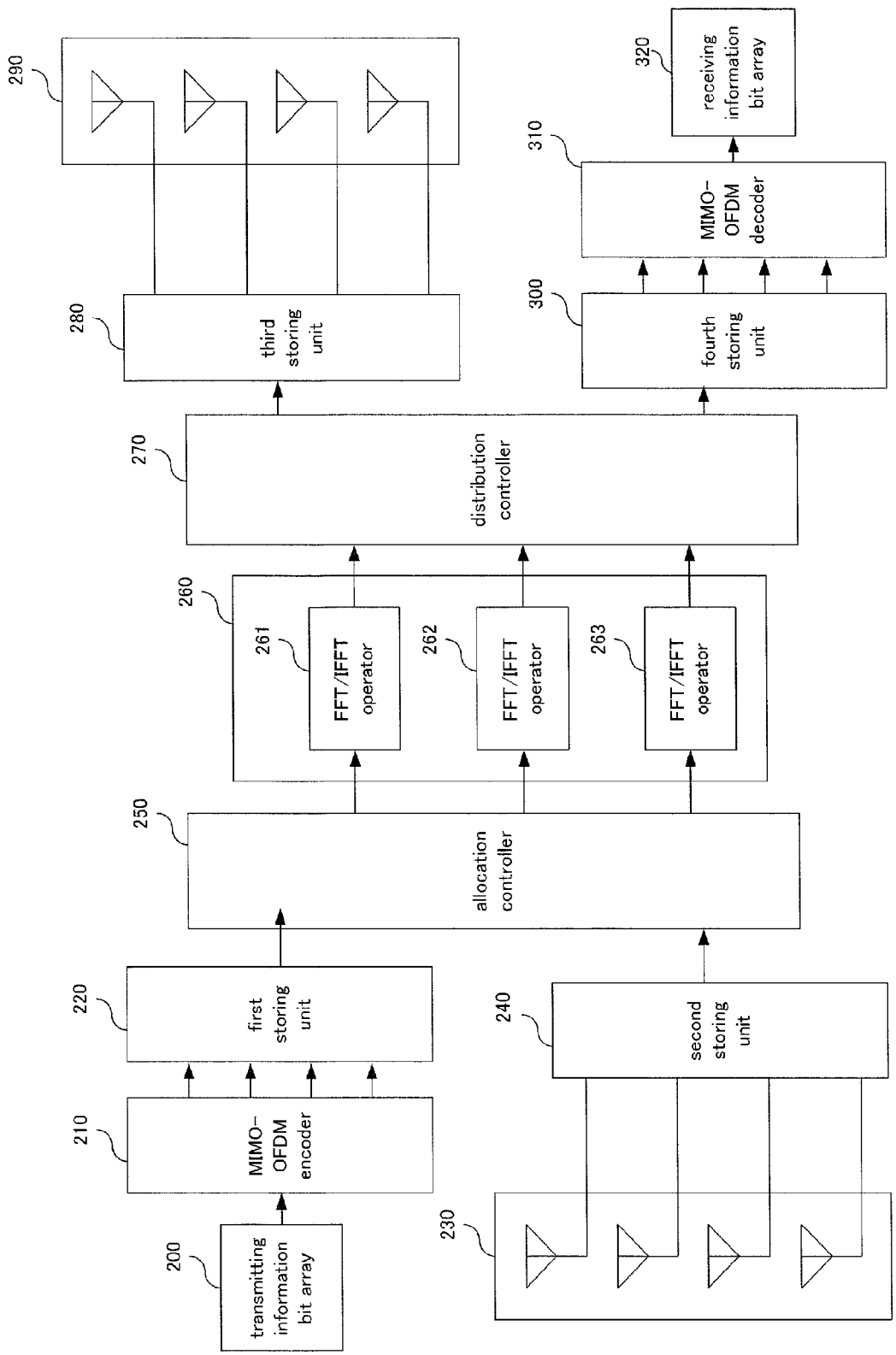

US 7,796,577 B2

1

METHOD FOR DESIGNING OPERATION SCHEDULES OF FFT AND MIMO-OFDM MODEM THEREOF

TECHNICAL FIELD

The present invention relates to a multiple input multiple output orthogonal frequency division multiplexing modem (MIMO-OFDM modem) and a designing method thereof. More particularly, the present invention relates to a method for designing operation schedules of fast Fourier transform (FFT) and a multiple input multiple output orthogonal frequency division multiplexing modem (MIMO-OFDM modem) thereof.

BACKGROUND ART

MIMO-OFDM communication schemes include a clustered OFDM scheme, a space-time trellis code OFDM scheme (STTC-OFDM), space-time block code OFDM scheme (STBC-OFDM), space-frequency block code OFDM scheme (SFBC-OFDM), etc.

The MIMO-OFDM has advantages in increasing a link budget, simplifying a receiving terminal, decreasing a peak-to-average power ratio (PAPR) of a transmitting terminal, etc. Here, the simplification of the receiving terminal does not mean a simplification of hardware, but rather a simplification of a mathematical process. When embodying hardware, there must be as many FFT operators in the receiving terminal as there are antennae. Accordingly, the size of a transmitting/receiving terminal becomes large.

FIG. 1 shows a schematic diagram of a structure of the MIMO-OFDM system.

The MIMO-OFDM system includes a transmitting terminal and a receiving terminal. The transmitting terminal includes a MIMO-OFDM encoder 20, n number of IFFT operators 30-1, 30-2, ..., and 30-n, and n number of transmitting antennae 40-1, 40-2, ..., and 40-n. The receiving antennae includes n number of receiving antennae 50-1, 50-2, ..., and 50-n, n number of FFT operators 60-1, 60-2, ..., and 60-n, and a MIMO-OFDM decoder 70.

The MIMO-OFDM encoder 20 receives a transmitting information bit array 10, and generates a transmitting data symbol.

The IFFT operators 30-1, 30-2, ..., and 30-n receive the transmitting data symbol, and generate a transmitting OFDM symbol.

The FFT operators 60-1, 60-2, ..., and 60-n receive a receiving OFDM symbol from the receiving antennae 50-1, 50-2, ..., and 50-n, and generate a receiving data symbol.

The MIMO-OFDM decoder 70 receives the receiving data symbol, and generates a receiving information bit array 80.

In an OFDM modem, in order to generate an OFDM symbol which is regarded as an OFDM signal, a symbol of which an original bit array is QAM-modulated (or QPSK-modulation, 16-QAM-modulation, 64-QAM-modulation, and etc.) is used. Hereinafter, the symbol will be referred to as a transmitting data symbol. In addition, the IFFT operator receives the transmitting data symbol, and generates an OFDM symbol. Here, the OFDM symbol will be referred to as a transmitting OFDM symbol.

Similarly, an OFDM symbol received from the receiving antenna will be referred to as a receiving OFDM symbol, and a QAM symbol which is generated by the FFT operator with the receiving OFDM symbol will be referred to as a receiving data symbol.

2

As shown in FIG. 1, a terminal needs n number of FIT operators for receiving. Since the FFT operator and the IFFT operator need a considerable amount of logic, an increase of the number of the operators causes a large load on hardware, especially on terminals.

An easy method for reducing the number of FFT operators or IFFT operators is to increase an operation speed of the operator. When the FFT operator is operated at a 4 times higher speed, the number of FFT operators may be reduced to ¼. However, there is a limit to the operation speed of the FFT operator, and a higher speed FFT operator generally has a more complex structure. Therefore, the operation speed of the FFT operator cannot be increased without limit.

FIG. 2 is a block diagram showing that the IFFT operator and the FFT operator can be provided in a single apparatus.

As shown in FIG. 2, when respectively setting a real number input and an imaginary number input of the FIT operator 110 to be an imaginary number input and a real number input of the IFFT operator 100, and respectively setting a real number output and an imaginary number output of the IFFT operator 110 to be an imaginary number output and a real number output of the IFFT operator 100, the IFFT operator 100 can be realized by the FFT operator 110. Also, when arranging contrarily, it is clear that the FIT operator can be realized by the IFFT operator.

Hereinafter, the apparatus designed to perform as both the FFT operator and the IFFT operator will be referred to as an FFT/IFFT operator. As shown in FIG. 2, in order to embody one FFT/IFFT operator, only logic for exchanging input/output is additionally necessary in addition to hardware logic for one FFT operator 1.

When using the FIT/IFFT operator, a receiver and a transmitter in a time division duplex (TDD) system may co-own the same FFT/IFFT operator.

FIG. 3 is a symbol layout view when respectively using the IFFT operator and the FFT operator for the transmitter and the receiver in the TDD system.

A transmitting/receiving symbol stream shows a time domain in which a radio channel is occupied by receiving OFDM symbols 1, 2, 3, 4, and 5, and transmitting OFDM symbols 6, 7, and 8. The receiving OFDM symbols 1, 2, 3, 4, and 5 are allocated to time slots 1, 2, 3, 4, and 5 of a FFT schedule, and are demodulated. The transmitting OFDM symbols 6, 7, and 8 are generated in time slots 6, 7, and 8 of an IFFT schedule through a modulation process.

As shown in FIG. 3, in the TDD system, due to a time for preparing the transmitting OFDM symbols 6, 7, and 8, durations in which rear part symbols 4 and 5 of the receiving OFDM symbols use the FFT operator and durations in which front part symbols 6 and 7 of the transmitting OFDM symbols use the IFFT operator are overlapped. Therefore, in a typical OFDM system, a time-sharing design for operation of the FFT/IFFT operator is necessary in order to process a transmitting/receiving process by using the FFT/IFFT operator.

FIG. 4 is a symbol layout view showing that the transmitter and the receiver co-own one FFT/IFFT operator when the operation speed of the FFT/IFFT operator is the same as a data transmission speed.

In order that the transmitter and the receiver may co-own one FFT/IFFT operator without time-sharing for the operation of the FFT/IFFT operator, the rear part symbols 4 and 5 of the receiving OFDM symbol need to be scheduled to process FFT operations in time slot 4 and 5 after the transmitting OFDM symbols 6, 7, and 8 are generated through the FFT/IFFT operator, as shown in FIG. 4. However, in this case, a problem occurs that processes for later demodulated symbols are delayed. After FFT operation, channel estimation, equalization, QAM demapping, channel decoder operation, and MAC layer operation also take time. Here, when some symbols are demodulated later, the whole demodulation process may be delayed.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention, which is for solving the problems of the prior arts, provides a method and modulation/demodulation apparatus for reducing the number of FFT and IFFT operators and minimizing a data process delay.

Technical Solution

An exemplary operation schedule design method for a fast Fourier transform (FFT) apparatus according to an embodiment of the present invention includes the following steps.

An operation speed of FFT/IFFT operator performing an FFT operation and an IFFT operation is set to be higher than a data transmission speed.

A receiving OFDM symbol is arranged in an FFT schedule in order that the receiving OFDM symbol may be demodulated after receiving the receiving OFDM symbol from a channel.

A transmitting OFDM symbol is arranged in the FIT schedule in order that the transmitting OFDM symbol may be generated before transmitting the transmitting OFDM symbol to the channel.

A first FFT schedule is filled by inserting symbols into idle durations of the first FFT schedule which are generated by the set operation speed, wherein the inserted symbols belong to OFDM symbol durations of a second FFT schedule which have the same timing as the first FFT schedule.

It is determined whether scheduling for all symbols is possible even when a part of a plurality of FFT schedules is deleted. FFT schedules are deleted as many as or less than the number of FFT schedules which is determined to be possible to delete.

The symbols of the FFT schedules, which are deleted, are re-arranged in non-deleted FFT schedules in order not to occur an error in symbol transmitting/receiving timing.

An exemplary multiple input multiple output orthogonal frequency division multiplexing (MIMO-OFDM) modulation/demodulation apparatus includes at least one antenna, a first storing unit, a second storing unit, a plurality of FFT/IFFT operators, an allocation controller, a distribution controller, a third storing unit, and a fourth storing unit.

The antenna performs transmitting/receiving of an OFDM signal. The first storing unit stores a transmitting data symbol.

The second storing unit stores a receiving OFDM symbol received from the antenna.

The plurality of FFT/IFFT operators perform as an IFFT operator for generating a transmitting OFDM symbol when receiving the transmitting data symbol, and perform as a FFT operator for generating a receiving data symbol when receiving the receiving OFDM symbol.

The allocation controller allocates symbols of the first storing unit and the second storing unit to the plurality of FFT/IFFT operators.

The distribution controller distributes symbols generated by the plurality of FFT/IFFT operators by classifying the symbols into the transmitting OFDM symbols and the receiving data symbols.

The third storing unit temporarily stores the transmitting OFDM symbols received from the distribution controller before transmitting the transmitting OFDM symbols through the antenna.

The fourth storing unit stores the receiving data symbols received from the distribution controller. Here, operation speeds of the FFT/IFFT operators are higher than a data transmission speed.

The allocation controller allocates the symbols to the FFT/IFFT operators according to a schedule which allows every symbol to be operated with the FFT/IFFT operators, wherein a number of the FFT/IFFT operators is less than a number of antennae.

ADVANTAGEOUS EFFECTS

According to the present invention, the FFT operation and the IFFT operation are processed by one FFT/IFFT operator in the MIMO-OFDM modulation/demodulation apparatus, so that symbols to be modulated/demodulated may be properly scheduled, a minimum number of FFT/IFFT operators may be needed, and a delay of data process may be minimized.

BRIEF DESCRIPTION OF THE DRAWINGS

FIG. 5. shows a symbol arrangement when the transmitter and the receiver use one FFT/IFFT operator.

FIG. 6 is a symbol arrangement when using a MIMO-OFDM modulation/demodulation apparatus including four antennae and four FFT/IFFT operators.

FIG. 7 is a flowchart illustrating a method for designing an FFT schedule in a MIMO-OFDM modulation/demodulation apparatus according to an exemplary embodiment of the present invention.

FIG. 8 illustrates a method for arranging a symbol FFT schedule of the MIMO-OFDM system having four antennae and three F/IFFT operators according to an exemplary embodiment of the present invention.

FIG. 9 is a symbol layout view of a MIMO-OFDM modulation/demodulation apparatus having four antennae and three FFT/IFFT operators according to another exemplary embodiment of the present invention.

FIG. 10 is a symbol layout view of a MIMO-OFDM modulation/demodulation apparatus having eight antennae and six FFT/IFFT operators according to a further exemplary embodiment of the present invention.

FIG. 11 is a schematic diagram illustrating a structure of the MIMO-OFDM modulation/demodulation apparatus according to an exemplary embodiment of the present invention.

BEST MODE FOR CARRYING OUT THE INVENTION

Figure 1:
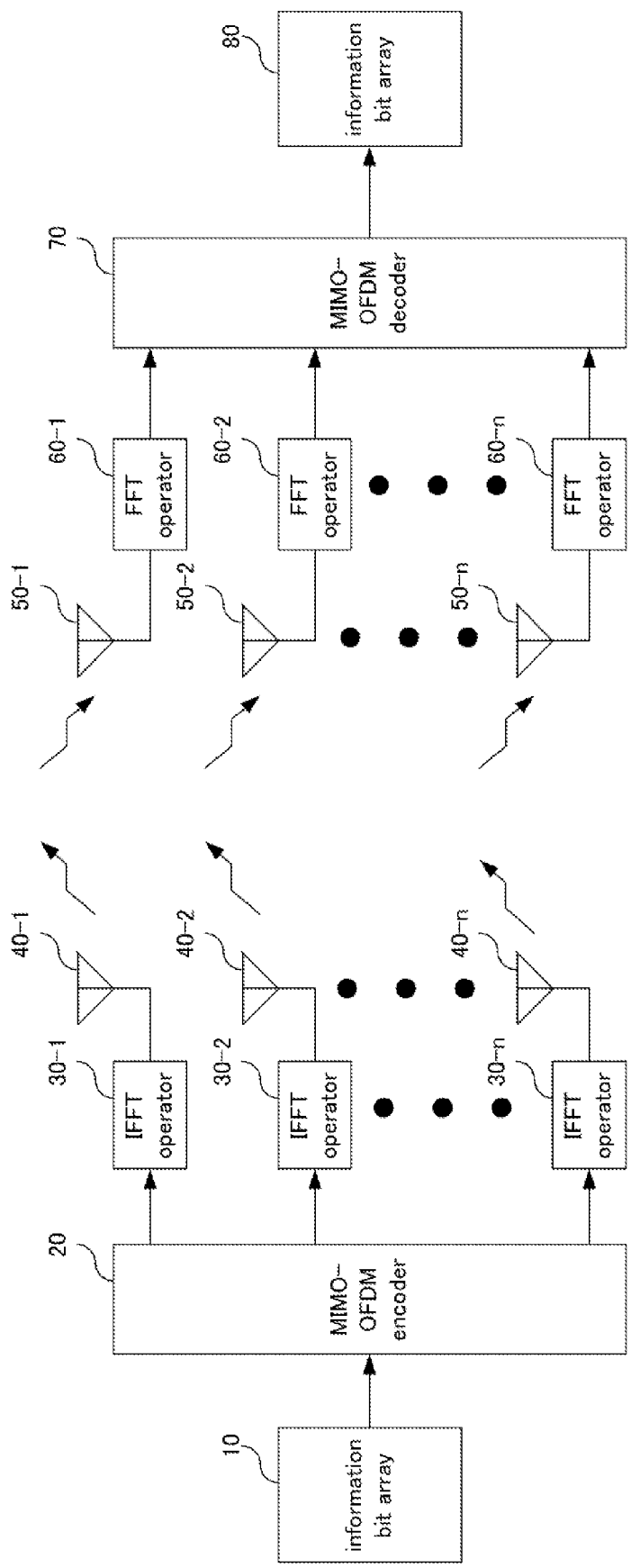
FIG. 1 shows a schematic diagram of a structure of the MIMO-OFDM system.
Figure 2:
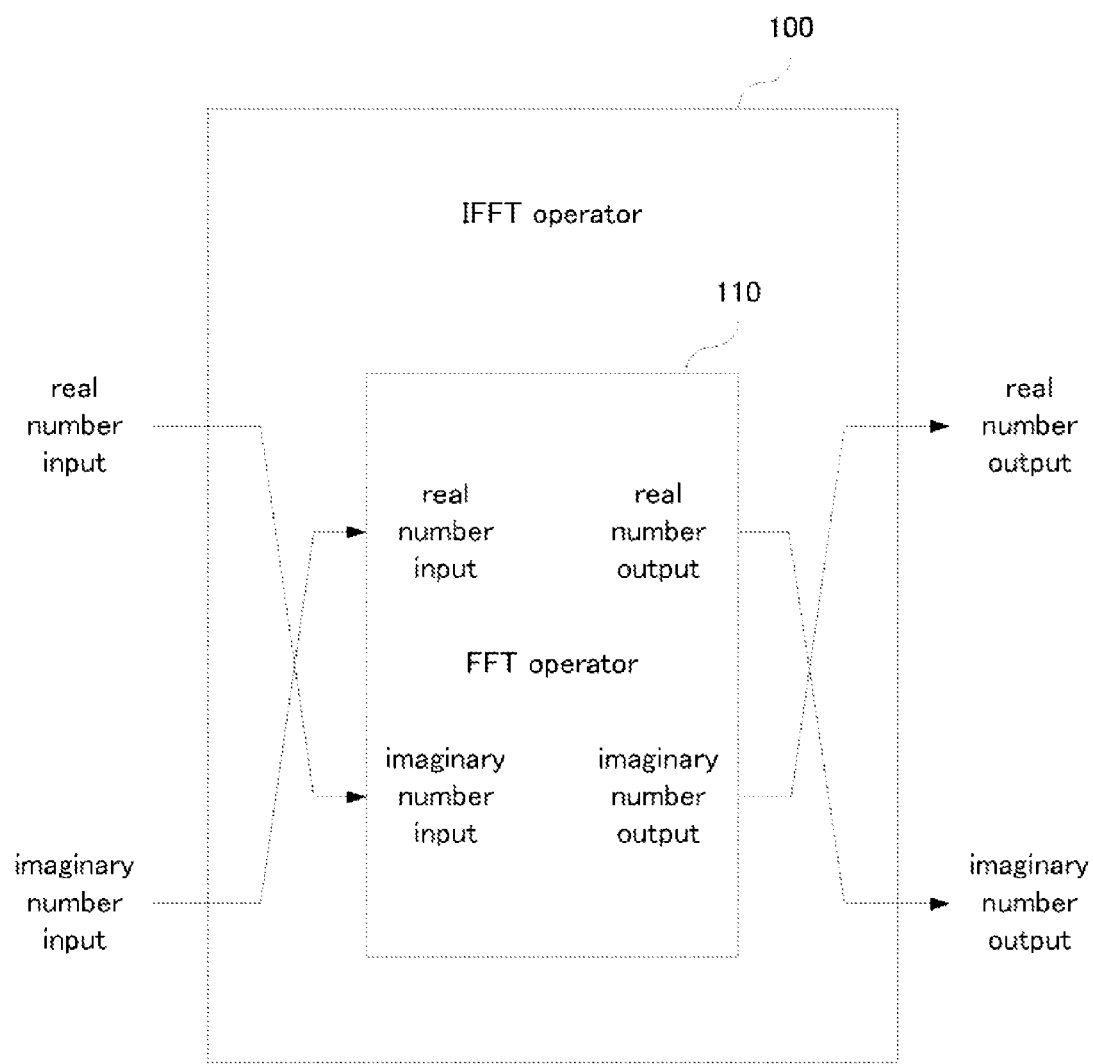
FIG. 2 is a block diagram showing that the IFFT operator and the FFT operator are realized in one apparatus.
Figure 3:
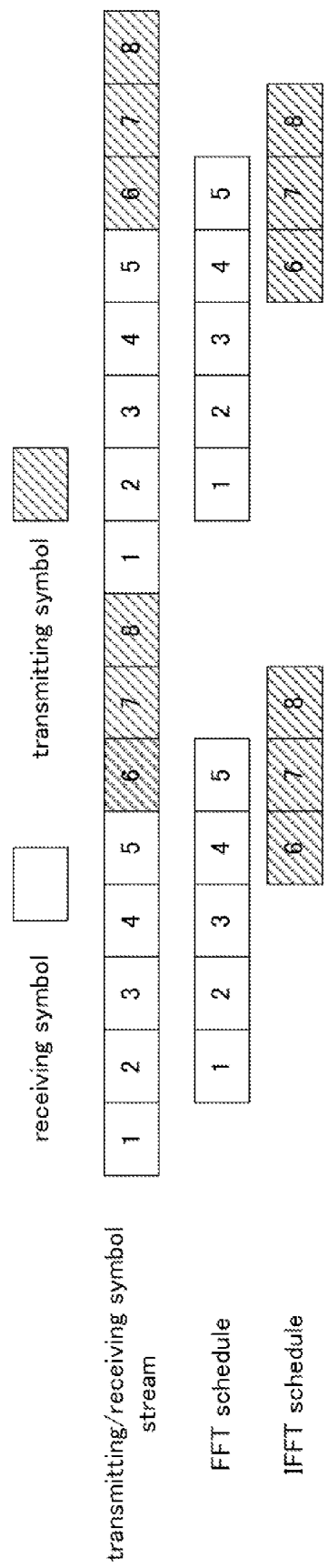
FIG. 3 is a symbol layout view when respectively using the IFFT operator and the FFT operator in a transmitter and a receiver in the TDD system.
Figure 4:
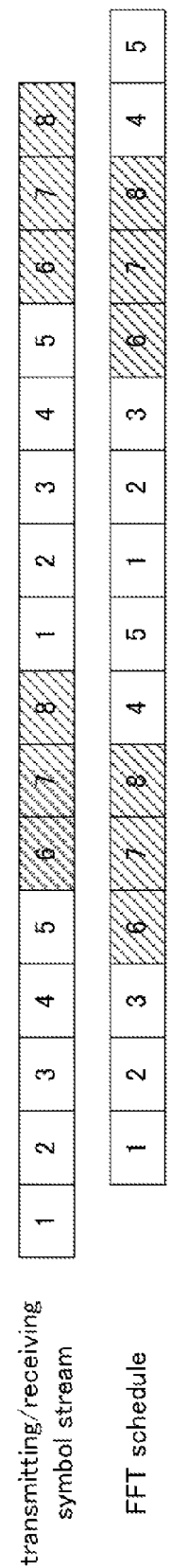
FIG. 4 is a symbol layout view of a case in which the transmitter and the receiver co-own one FFT/IFFT operator when operation speed is the same as data transmission speed.

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 5 shows a symbol arrangement when the transmitter and the receiver use one FFT/IFFT operator.

A transmitting/receiving symbol stream is a data stream in which a transmitting/receiving OFDM symbol is arranged on a time axis of a channel. In the TDD system, both transmission and receiving are performed by dividing the time axis of the channel. Hereinafter, a duration in which an OFDM symbol occupies the channel will be referred to as an OFDM symbol duration. For example, in a transmitting/receiving symbol stream of FIG. 5, symbol 1 or symbol 2 are respectively one OFDM symbol duration, and in a FFT schedule of FIG. 5, a sum of a symbol 4 and a symbol 6 is one OFDM symbol duration.

FFT schedule means a sequence in which symbols are arranged in the FFT/IFFT operator.

Arranging symbols in the FFT schedule means both arranging a receiving OFDM symbol in the FFT schedule and arranging a transmitting OFDM symbol in the IFFT schedule.

Arranging the receiving an OFDM symbol in the FFT schedule means arranging durations in which the FFT/IT operator is used to demodulate each received receiving OFDM symbol received from the channel in the FFT schedule. In other words, it means arranging the durations for generating receiving data symbols on the FFT schedule, wherein the receiving data symbols are generated by demodulating the received receiving OFDM symbol received from the channel by an FFT operation.

Meanwhile, arranging the transmitting OFDM symbol in the FFT schedule means arranging durations in which the FFT/IFFT operator is used to generate each transmitting OFDM symbol in the FFT schedule. In other words, it means arranging the durations for generating transmitting OFDM symbols to be transmitted to the channel on the FFT schedule, wherein the transmitting data symbols are demodulated by the IFFT operation.

When designing the operation speed of the FFT operator to be twice the data transmission speed, two symbols can be arranged in one FFT schedule duration which corresponds to one OFDM symbol duration.

Therefore, as shown in FIG. 5, the receiving OFDM symbols 1, 2, 3, 4, and 5 are arranged in a front half of each FFT schedule duration corresponding to the next OFDM symbol duration of each OFDM symbol. The transmitting OFDM symbols 6, 7, and 8 are arranged in a rear half of each FFT schedule duration corresponding to the previous OFDM symbol duration of each OFDM symbol.

When using the modulation/demodulation apparatus realized by the thus-arranged FFT schedule, the transmitter and the receiver may perform FFT/IFFT operations by using one FIT operator, and a modulation/demodulation delay may be eliminated.

FIG. 6 is a symbol arrangement when using a MIMO-OFDM modulation/demodulation apparatus including four antennae and four FFT/IFFT operators.

FIG. 6 is an extended diagram of FIG. 5 which illustrates a symbol arrangement when the number of antennae is four. As shown in FIG. 6, a MIMO-OFDM modulation/demodulation apparatus having four antennae can be realized by four FFT/IFFT operators.

According to an exemplary embodiment of the present invention, a method for providing an equivalent operation speed as that of the OFDM modulation/demodulation apparatus having the symbol arrangement shown in FIG. 6 by using less number of FFT/IFFT operators than the number of antennae is proposed.

FIG. 7 is a flowchart illustrating a method for designing an FFT schedule in a MIMO-OFDM modulation/demodulation apparatus according to an exemplary embodiment of the present invention.

As shown in FIG. 7, the operation speed of the FFT/IFFT operator is set to be higher than the data transmission speed in step S100. In order to generate an idle duration in which other symbols may be inserted, the operation speed of the FFT/IFFT operator needs to be at least twice faster than the data transmitting/receiving speed. The operation speed of the FFT/IFFT operator is not limited only to twice, but it may be set to be faster than twice when hardware performance is sufficient.

After receiving the receiving OFDM symbol from the channel, the receiving OFDM symbol is arranged in the FFT schedule so that the receiving OFDM symbol may be demodulated in step S110. Before transmitting the transmitting OFDM symbol to the channel, the transmitting OFDM symbol is arranged in the FFT schedule so that the transmitting OFDM symbol may be generated in step S120. This is because the FFT schedule can be arranged after all OFDM symbols are received, and transmitting OFDM symbol can be transmitted after all transmitting OFDM symbols are generated. Here, the receiving OFDM symbol is arranged in the FFT schedule so that the receiving OFDM symbol may be demodulated at the one OFDM symbol duration moment later than the moment of receiving the receiving OFDM symbol from the channel. Similarly, the transmitting OFDM symbol is arranged in the FFT schedule channel so that the transmitting OFDM symbol is generated at the one OFDM symbol duration before the moment of transmitting the transmitting OFDM symbol to the channel.

Afterward, the first FFT schedule is filled by inserting a symbol of a second FFT schedule, which belongs to an OFDM symbol duration corresponding to an idle duration of the first FFT schedule, in step S130. Here, the idle duration of a first FFT schedule is generated due to the high operation speed.

It is determined whether all the symbols can be scheduled even though some of a plurality of FFT schedules are deleted, in step S140. When it is possible, the same or a smaller number of FFT schedules than the number of IFFT schedules which is possible to be deleted is deleted in step S150.

It will be described in detail how to determine that all the symbols can be scheduled even though some of the IFFT schedules are deleted.

The number of symbols $N_s$ which is to be processed not in an original OFDM symbol duration but in another OFDM symbol duration, is given as Equation 1.

$$N_S = 2 \times (N_A \times 2 - N_F \times S_F) \qquad \text{Equation 1}$$

Here, $N_A$ indicates the number of antennae, $N_F$ indicates the number of FFT/IFFT operators to be used, and $S_F$ indicates the speed of the FFT/IFFT operator (i.e., the speed of the FFT/IFFT operator per transmitting/receiving data speed).

When arranging $N_s$ number of symbols in other OFDM symbol durations, the number of symbols $R_s$ to be arranged in a neighboring one OFDM symbol duration is given as Equation 2.

$$R_S = N_F \times S_F - N_A \qquad \text{Equation 2}$$

When arranging the symbols in order to allow only one OFDM symbol duration delay, Ns should be $$N_S \leq 2 \times R_S,$$

and the number of FFT/IFFT operators N should fulfill the following Equation 3.

$$2 \times (N_A \times 2 - N_F \times S_F) \leq 2 \times (N_F \times S_F - N_A) \qquad \text{Equation 3}$$

Equation 3 may be expressed simply as Equation 4.

$$\frac{3N_A}{2S_F} \leq N_F \qquad \text{MathFigure 4}$$

Equation 4 indicates the minimum number of FFT/IFFT operators necessary for embodying a MIMO-OFDM modem. The number of FFT/IFFT operators is expressed as a function of the number of antennae and the operation speed of the FFT/IFFT operator. When allowing more delay than one OFDM symbol duration, the MIMO-OFDM modem can be realized with less FFT operators. However, this will affect modulation/demodulation timing of the whole system.

Therefore, it is determined whether the number of FFT schedules is larger than a rounding up figure of a value which is given by dividing three times the number of antennae with twice the operation speed of the FFT/IFFT operator, when determining to delete a IFFT schedule or not in order to allow one OFDM symbol delay. When the number of FFT schedules before deleting is greater, the difference between the numbers of FFT schedules may be deleted.

Finally, the deleted FFT schedules are re-arranged in the non-deleted FFT schedules in order to not have errors occur in symbol timing, in step S160. In more detail, receiving symbols of the deleted FFT schedules are re-arranged in the non-deleted FFT schedules in order to allow at most one OFDM symbol duration delay compared with the original OFDM symbol duration timing. Transmitting symbols of the deleted FFT schedules are re-arranged in the non-deleted FFT schedules in order to allow at most one OFDM symbol duration preceding compared with the original OFDM symbol duration timing. Here, the receiving OFDM symbols and the transmitting OFDM symbols are re-arranged so that they may be continuously arranged, respectively.

Here, an error in symbol timing means a case in which the receiving OFDM symbol is arranged in the FFT schedule even before it is received from the channel, or a case in which the transmitting OFDM symbol is arranged in the FFT schedules after the timing when it should be transmitted to the channel. Briefly, it means an inconsistency in time sequence of the symbols.

Therefore, when arranging the symbols of the deleted FFT schedule in order to not have the error occur in symbol timing, the transmitting OFDM symbol needs to be generated before it is transmitted to the channel, and the receiving OFDM symbol needs to be arranged in the FFT schedule after it is received from the channel.

In a duration in which modulation and demodulation are not overlapped, the number of the symbols $N_S$, which is not arranged in the original OFDM symbol duration but should be arranged in the other OFDM symbol durations, may be under 0. However, in the OFDM symbol duration in which modulation and demodulation are overlapped, $N_S$ may be larger than 0. Therefore, $$\frac{N_S}{2}$$

number of symbols for modulation are arranged one OFDM symbol duration earlier than an original OFDM symbol duration timing, $$\frac{N_S}{2}$$

number of symbols for demodulation are arranged one OFDM symbol duration later than an original OFDM symbol duration timing.

In the same OFDM symbol duration, the symbol arrangement can be changed. In addition, in the same FFT schedule, sequence of the symbols can be changed, and among the FFT schedules, symbol arrangement may be changed. As described above, the receiving OFDM symbol and the transmitting OFDM symbol are respectively arranged so that they are continuously arranged, respectively.

FIG. 8 shows the process described above according to an exemplary embodiment of the present invention.

FIG. 8 illustrates a method for arranging a symbol FFT schedule of the MIMO-OFDM system having four antennae and three FFT/IFFT operators according to an exemplary embodiment of the present invention.

In a final symbol arrangement layout, the transmitting OFDM symbols are continuously arranged with each transmitting OFDM symbol, and the receiving OFDM symbols are continuously arranged with each receiving OFDM symbol. Some of the receiving symbols 25 and 35 are delayed one OFDM symbol duration from the original OFDM symbol duration, and some of the transmitting symbols 06 and 16 precede one OFDM symbol duration from the original OFDM symbol duration.

Figure 9:
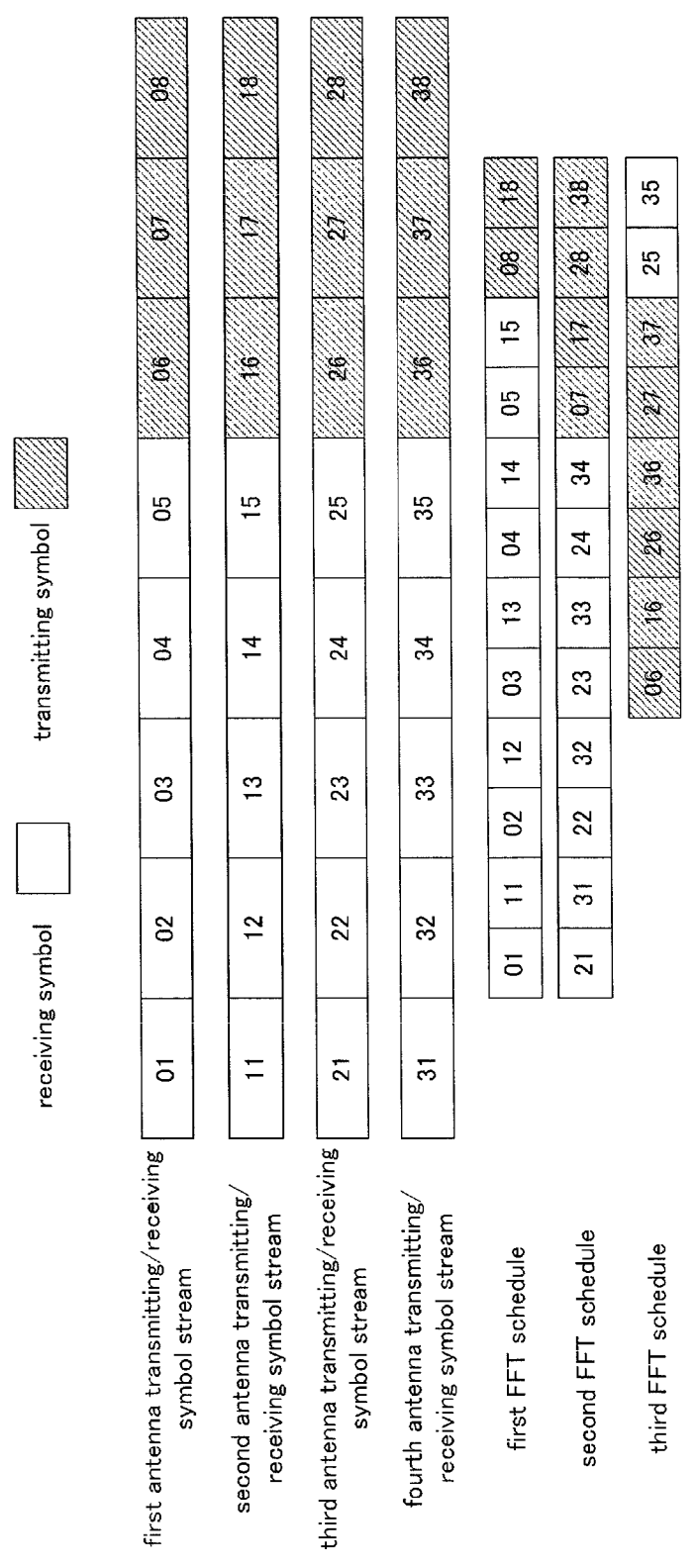

FIG. 9 is a symbol layout view of a MIMO-OFDM modulation/demodulation apparatus having four antennae and three FFT/IFFT operators according to another exemplary embodiment of the present invention.

The symbol layout view shown in FIG. 9 according to another exemplary embodiment uses the scheduling method described in FIG. 7, but has some changes from the symbol layout shown in FIG. 8.

Figure 10:
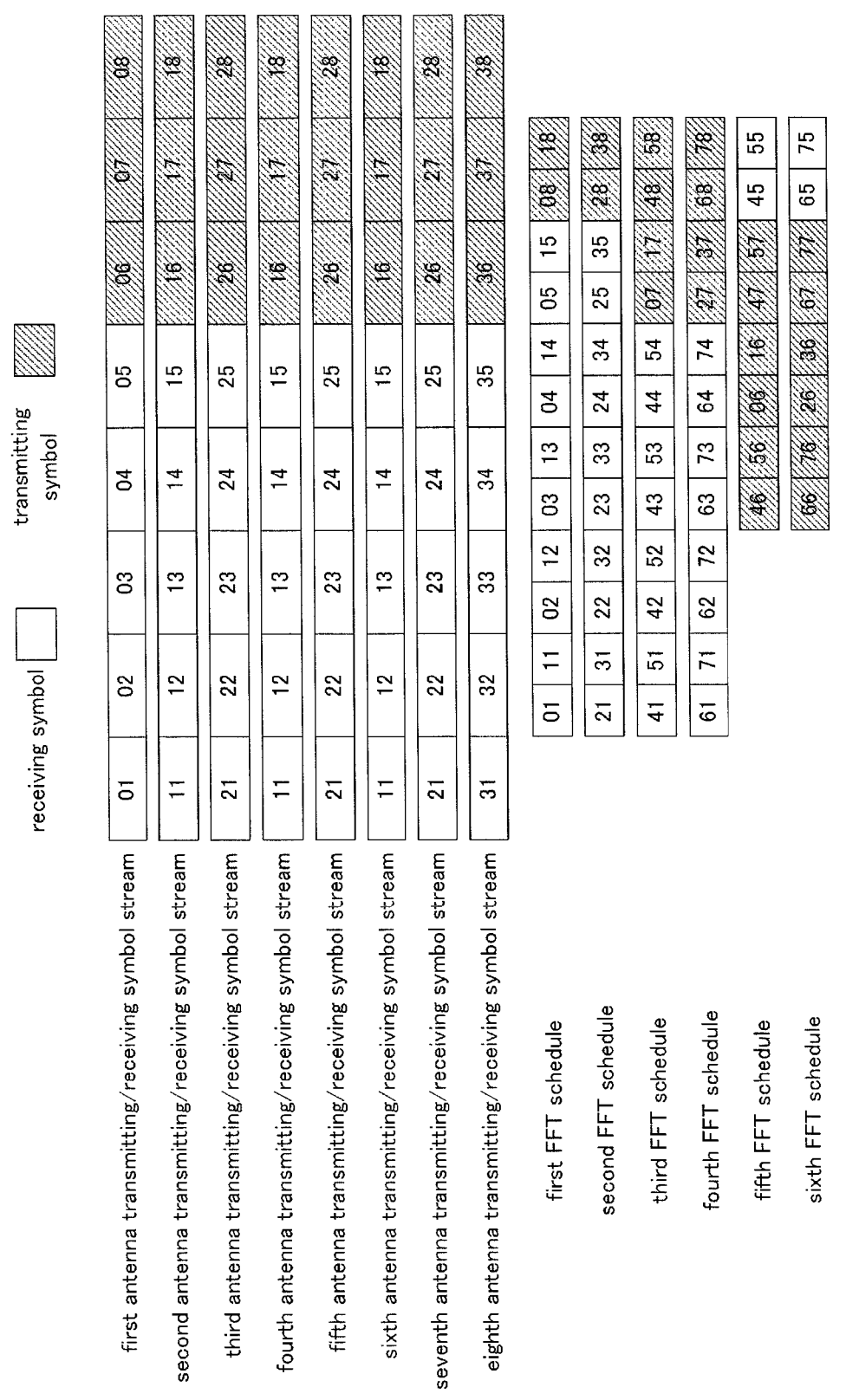

FIG. 10 is a symbol layout view of a MIMO-OFDM modulation/demodulation apparatus having eight antennae and six FFT/IFFT operators according to a further exemplary embodiment of the present invention.

FIG. 10 is an exemplary embodiment showing that FFT operation and IFFT operation can be performed by using a lesser number of FFT/IFFT operators than the number of antennae.

FIG. 11 is a schematic diagram illustrating a structure of the MIMO-OFDM modulation/demodulation apparatus according to an exemplary embodiment of the present invention.

As shown in FIG. 9, in a MIMO-OFDM system having four transmitting antennae and four receiving antennae, a MIMO-OFDM modulation/demodulation apparatus may be realized by three FFT operators.

The MIMO-OFDM modulation/demodulation apparatus according to an exemplary embodiment of the present invention includes a MIMO-OFDM encoder 210, a first storing unit 220, a receiving antenna 230, a second storing unit 240, an allocation controller 250, a plurality of FFT/IFFT operator groups 260, a distribution controller 270, a third storing unit 280, a transmitting antenna 290, a fourth storing unit 300, and a MIMO-OFDM decoder 310.

The transmitting antenna 290 and the receiving antenna 230 perform transmitting/receiving of an OFDM signal. In an exemplary embodiment of the present invention, four transmitting antennae and four receiving antennae are used.

The MIMO-OFDM encoder 210 receives a transmitting information bit array 200, and generates a transmitting data symbol. Here, the transmitting data symbol is a symbol of an original bit array is QAM-modulated (or QPSK-modulated, 16-QAM-modulated, 64-QAM-modulated, etc.) to generate an OFDM symbol which is regarded as an OFDM signal.

The transmitting data symbol is stored in the first storing unit 220.

A receiving OFDM symbol received by the receiving antenna 230 is stored in the second storing unit 240.

The FFT/IFFT operator group 260 includes a plurality of FFT/IFFT operators 261, 262, and 263. For the transmitting terminal, the FFT/IT operator group 260 functions as an IFFT operator, which receives the transmitting data symbol and generates the transmitting OFDM symbol by using the transmitting data symbol, and for the receiving terminal, functions as a FIT operator, which receives the receiving OFDM symbol, and generates the receiving data symbol. The FFT/IFFT operator group 260 includes a lesser number of FFT/IFFT operators 261, 262, and 263 than the number of the transmitting/receiving antennae 230 and 290. The operation speeds of the FFT/IFFT operators 261, 262, and 263 are faster than the data transmission speed. In an exemplary embodiment of the present invention, three FFT/IFFT operators are used.

The allocation controller 250 allocates symbols in the first storing unit 220 and the second storing unit 240 to the FFT/IFFT operators 261, 262, and 263 of the FFT/IFFT operator group 260. Here, the allocation controller 250 allocates the symbols by using the FFT schedule which enables all the symbols to be operated by the lesser number of the FFT/IFFT operators 261, 262, and 263 than the number of the transmitting/receiving antennae 230 and 290.

The first storing unit and the second storing unit are necessary because it is not possible for the transmitting data symbols passed MIMO-OFDM encoder and the receiving OFDM symbols received from the channel to be allocated to the FFT/IFFT operator at once.

The distribution controller 270 distributes symbols generated by the FFT/IFFT operator group 260 into the transmitting OFDM symbol and the receiving data symbol.

The transmitting OFDM symbol is temporarily stored in the third storing unit 280 before being transmitted through the transmitting antenna 290. The transmitting OFDM symbol is stored in the third storing unit before being transmitted to the channel, because the transmitting OFDM symbols are not generated simultaneously. As shown in FIG. 8, the transmitting OFDM symbols 06, 16, 26, and 36 are transmitted to the channel at once, but they are generated sequentially in the FFT schedule. This is why the storing units are needed temporarily before transmitting.

The receiving data symbol is stored in the fourth storing unit 300 by the distribution controller 270.

The MIMO-OFDM decoder 310 receives the receiving data symbol from the fourth storing unit 300, and generates a receiving information bit array 320 by using the receiving data symbol.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An operation schedule design method for a fast Fourier transform (FFT) apparatus, comprising:
    setting an operation speed of an FFT/Inverse FFT (IFFT) operator performing an FFT operation and an IFFT operation to be higher than a data transmission speed;
    arranging a receiving Orthogonal Frequency Division Multiplexing (OFDM) symbol in a first FFT schedule in order that the receiving OFDM symbol may be demodulated after receiving the receiving OFDM symbol from a channel;
    arranging a transmitting OFDM symbol in the FFT schedule in order that the transmitting OFDM symbol may be generated before transmitting the transmitting OFDM symbol to the channel;
    filling a first FFT schedule by inserting symbols into idle durations of the first FFT schedule, wherein the inserted symbols belong to OFDM symbol durations of a second FFT schedule which have the same timing as the first FFT schedule;
    determining whether scheduling for all symbols is possible when a part of a plurality of FFT schedules is deleted;
    deleting FFT schedules of as many as or less than the number of FFT schedules which is determined to be possible to delete in the determining of whether scheduling for all symbols is possible; and
    re-arranging symbols of the deleted FFT schedules, in non-deleted FFT schedules in order to not have an error occur in symbol transmitting/receiving timing.

2. The operation schedule design method of claim 1, wherein the rearranging of the symbols of the deleted FFT schedules comprises re-arranging the receiving symbols of the deleted FFT schedules in non-deleted FFT schedules to allow at most one OFDM symbol duration delay compared with an original OFDM symbol duration timing.

3. The operation schedule design method of claim 2, wherein the re-arranging of the symbols of the deleted FFT schedules comprises re-arranging symbols belonging to the same OFDM symbol durations so that the receiving OFDM symbols and the transmitting OFDM symbols may be respectively continuous.

4. The operation schedule design method of claim 2, wherein:
    the arranging of the receiving OFDM symbol comprises arranging the receiving OFDM symbol in the FFT schedule to be demodulated one OFDM symbol duration later than a moment that the receiving OFDM symbol is received from the channel; and
    the arranging of the transmitting OFDM symbol comprises arranging the transmitting OFDM symbol in the FFT schedule to be generated one OFDM symbol duration earlier than a moment that the transmitting OFDM symbol is transmitted to the channel.

5. The operation schedule design method of claim 1, wherein, the re-arranging of the deleted FFT schedules comprises re-arranging transmitting symbols of the deleted FFT schedules in non-deleted FFT schedules to allow at most one OFDM symbol duration preceding compared with an original OFDM symbol duration timing.

6. The operation schedule design method of claim 5, wherein, the re-arranging of the symbols of the deleted FFT schedules comprises re-arranging symbols belonging to the same OFDM symbol durations so that the receiving OFDM symbols and the transmitting OFDM symbols may be respectively continuous.

7. The operation schedule design method of claim 5, wherein:
the arranging of the receiving OFDM symbol comprises arranging the receiving OFDM symbol in the FFT schedule to be demodulated one OFDM symbol duration later than a moment that the receiving OFDM symbol is received from the channel; and
the arranging of the transmitting OFDM symbol comprises arranging the transmitting OFDM symbol in the FFT schedule to be generated one OFDM symbol duration earlier than a moment that the transmitting OFDM symbol is transmitted to the channel.

8. The operation schedule design method of claim 1, wherein:
the determining of whether scheduling for all symbols is possible comprises determining whether a number of the FFT schedules is larger than a rounding up figure of a value which is given by dividing three times a number of antennae with twice the operation speed of the FFT/IFFT operator; and
the deleting of the FFT schedules comprises, when the number of the FFT schedules is determined to be larger in the determining of whether scheduling for all symbols is possible, the FFT schedule is deleted, wherein the number of FFT schedules to be deleted is the same as or less than a difference between the number of the FFT schedules and the rounding up figure of a value which is given by dividing three times a number of antennae with twice the operation speed of the FFT/IFFT operator.

9. A multiple input multiple output (MIMO) orthogonal frequency division multiplexing (OFDM) (MIMO-OFDM) modulation/demodulation apparatus comprising:
at least two antennas for transmitting/receiving an OFDM signal;
a first storing unit for storing a transmitting data symbol;
a second storing unit for storing a receiving OFDM symbol received from the at least two antennas;
a plurality of Fast Fourier Transform/Inverse Fast Fourier Transform (FFT/IFFT) operators performing as an IFFT operator for generating a transmitting OFDM symbol when receiving the transmitting data symbol, and performing as an FFT operator for generating a receiving data symbol when receiving the receiving OFDM symbol;
an allocation controller for allocating symbols of the first storing unit and the second storing unit to the plurality of FFT/IFFT operators;
a distribution controller for distributing symbols generated by the FFT/IFFT operators by classifying the symbols into the transmitting OFDM symbols and the receiving data symbols;
a third storing unit for temporarily storing the transmitting OFDM symbols received from the distribution controller before transmitting the transmitting OFDM symbols through the at least two antennas; and
a fourth storing unit for storing the receiving data symbols received from the distribution controller,
wherein operation speeds of the FFT/IFFT operators are higher than a data transmission speed, and the allocation controller allocates the symbols to the FFT/IFFT operators according to a schedule which allows every symbol to be operated with the FFT/IFFT operators, wherein a number of the FFT/IFFT operators is less than a number of antennae.

10. The MIMO-OFDM modulation/demodulation apparatus of claim 9, wherein the allocation controller allocates the symbols to the FFT/IFFT operators according to a schedule which is formed by inserting symbols into idle durations of the first FFT schedule which is generated because the operation speed of the FFT/IFFT operator is set to be higher than the data transmission speed, wherein the inserted symbols belong to OFDM symbol durations of a second FFT schedule which have the same timing as a first FFT schedule.

11. The MIMO-OFDM modulation/demodulation apparatus of claim 10, wherein the allocation controller determines whether scheduling for all symbols is possible when a part of a plurality of FFT schedules is deleted, deletes FFT schedules of as many as or less than the number of FFT schedules which is determined to be possible to delete, and allocates each symbol according to a schedule in which symbols of a deleted FFT schedule are re-arranged in non-deleted FFT schedules in order to not have an error occur in symbol transmitting/receiving timing.

* * * * *